(12) United States Patent
Kodera et al.

(10) Patent No.: US 8,556,668 B2
(45) Date of Patent: Oct. 15, 2013

(54) MARINE PROPULSION DEVICE

(75) Inventors: Masanori Kodera, Tokyo (JP); Yoshiki Nanke, Ota (JP); Koichi Shiraishi, Ota (JP); Yasuo Aizawa, Ota (JP); Toshiyuki Saito, Ota (JP)

(73) Assignee: Niigata Power Systems Co., Ltd., Tokyo (JP)

( * ) Notice: Subject to any disclaimer, the term of this patent is extended or adjusted under 35 U.S.C. 154(b) by 0 days.

(21) Appl. No.: 13/386,850

(22) PCT Filed: Aug. 20, 2010

(86) PCT No.: PCT/JP2010/064651
§ 371 (c)(1),
(2), (4) Date: Jan. 24, 2012

(87) PCT Pub. No.: WO2011/021727
PCT Pub. Date: Feb. 24, 2011

(65) Prior Publication Data
US 2012/0129411 A1   May 24, 2012

(30) Foreign Application Priority Data

Aug. 21, 2009 (JP) .................................. 2009-192186
Oct. 20, 2009 (JP) .................................. 2009-241619

(51) Int. Cl.
*B63H 21/20* (2006.01)
(52) U.S. Cl.
USPC ............. 440/3; 440/4; 440/6; 440/75; 440/86
(58) Field of Classification Search
USPC ......................................... 440/3, 6, 75, 86, 1
See application file for complete search history.

(56) References Cited

U.S. PATENT DOCUMENTS

| | | | |
|---|---|---|---|
| 7,147,523 B2* | 12/2006 | Mori et al. .................... | 440/3 |
| 7,862,393 B2* | 1/2011 | Levander et al. ............. | 440/3 |
| 7,984,684 B2* | 7/2011 | Hinderks ..................... | 114/274 |
| 8,157,070 B2* | 4/2012 | Okanishi et al. ............. | 192/51 |

(Continued)

FOREIGN PATENT DOCUMENTS

| | | |
|---|---|---|
| JP | U-S48-11594 | 2/1973 |
| JP | S61-108699 U | 7/1986 |

(Continued)

*Primary Examiner* — Lars A Olson
*Assistant Examiner* — Jovon Hayes
(74) *Attorney, Agent, or Firm* — Manabu Kanesaka

(57) ABSTRACT

In a hybrid type marine propulsion device including a main engine and a motor, low fuel consumption is realized by a compact configuration and highly efficient drive control.

A marine propulsion device includes a clutch 7 provided on an input shaft 6 of a main engine, a horizontal input/output shaft 8 connected to the clutch, a vertical shaft 11 connected to the input/output shaft through an upper bevel gear 9, a horizontal propeller shaft 13 connected to a lower end of the vertical shaft through a lower bevel gear 12, and a propeller 14 at the other end side of the propeller shaft, in which the propeller is revolved around the vertical shaft to set a propulsion direction, wherein a motor generator 20 is mounted on a floor 3, and connected directly to the other end side of the input/output shaft. In a low rotation region, motor propulsion is performed, and in a high rotation region, hybrid propulsion in which the main engine is assisted by the motor is performed.

5 Claims, 15 Drawing Sheets

(56) References Cited

U.S. PATENT DOCUMENTS

| | | |
|---|---|---|
| 2002/0140786 A1 | 10/2002 | Sugahara |
| 2008/0166934 A1 | 7/2008 | Levander et al. |
| 2009/0209146 A1* | 8/2009 | Jegel ............................. 440/3 |
| 2010/0203777 A1* | 8/2010 | Bratel ............................. 440/3 |
| 2012/0129411 A1* | 5/2012 | Kodera et al. ................. 440/3 |
| 2012/0231681 A1* | 9/2012 | Shibayama ..................... 440/3 |
| 2012/0309242 A1* | 12/2012 | Haugland ....................... 440/3 |

FOREIGN PATENT DOCUMENTS

| | | |
|---|---|---|
| JP | H05-19636 Y2 | 5/1993 |
| JP | 2001-270495 | 10/2001 |
| JP | 2003-80955 | 3/2003 |
| JP | 2004-260905 | 9/2004 |
| JP | 2005-053324 | 3/2005 |
| JP | 2008-532838 A | 8/2008 |

\* cited by examiner

Fig.3

| | | NUMBER OF REVOLUTION OF INPUT/OUTPUT | MAIN ENGINE | POWER TRANSMISSION CLUTCH | MOTOR GENERATOR | GENERATION ENGINE | CONDENSED DISCHARGE MECHANISM | NOTES |
|---|---|---|---|---|---|---|---|---|
| SHIP RUNNING STATE | (MOTOR PROPULSION REGION) | EQUAL TO OR LESS THAN PRESET NUMBER OF REVOLUTIONS | STOP/IDLE | DISENGAGED | SPEED-CONTROLLED | TWO DEVICES OPERATED | CHARGED/DISCHARGED | MOTOR ONLY |
| | (HYBRID REGION) | EQUAL TO OR MORE THAN PRESET NUMBER OF REVOLUTIONS | OPERATED | FITTED | TORQUE-CONTROLLED | TWO DEVICES OPERATED | CHARGED/DISCHARGED | TORQUE ASSIST BY MAIN ENGINE + MOTOR/ POWER GENERATION |
| | ANCHORED STATE | — | STOPPED | DISENGAGED | STOPPED | ONE DEVICE OPERATED | CHARGED | — |
| | SHORE POWER RECEIVING STATE | — | STOPPED | DISENGAGED | STOPPED | STOPPED | CHARGED | — |
| | IN CASE OF EMERGENCY | EQUAL TO OR MORE THAN NUMBER OF IDLING | OPERATED | FITTED | STOPPED | ONE DEVICE OPERATED | NOT USED | MAIN ENGINE ONLY |

Fig. 5  SHIP RUNNING STATE (MOTOR PROPULSION REGION)

and claims priority from Japanese Application No. 2009-192186, filed Aug. 21, 2009 and No. 2009-241619, filed Oct. 20, 2009.

MARINE PROPULSION DEVICE

RELATED APPLICATIONS

The present application is National Phase of International Application No. PCT/JP2010/064651 filed Aug. 20, 2010, and claims priority from Japanese Application No. 2009-192186, filed Aug. 21, 2009 and No. 2009-241619, filed Oct. 20, 2009.

TECHNICAL FIELD

This invention relates to the so-called azimuth thruster, which sets the propulsion direction by revolving a horizontal propeller shaft around a vertical shaft for transmitting power and particularly to a marine propulsion device which enables propulsion in a motor generator simplex, propulsion in a main engine simplex, and hybrid propulsion in which the assist of the motor generator is added to the output of the main engine.

BACKGROUND ART

In a work barge such as a tugboat, since a main engine is selected according to the output required in work, the load factor of the main engine is lowered in the moving or standby state except the working state, and this is unfavorable in the fuel cost and the maintenance and management. Further, when being on standby in the offing, moving at low speed is needed to keep a position according to the sea meteoric conditions. However, since the work barge mostly uses a fixed pitch propeller, in the case where the number of revolutions of the main engine is lower than the idling number of revolutions, the speed is controlled by the slip control of a clutch. Consequently, output loss and heating loss due to a slip occur to lower the efficiency, and further the emission amount of greenhouse gas is larger as compared with the obtained output.

On the other hand, in the variable speed control by electric propulsion which has been increasing in recent years, the slip control in the low speed moving state is not required, but the work barge such as a tugboat requires great output in work, so that when transmission loss due to electric propulsion is taken into consideration, the required capacity of a power generation engine and output of the motor are increased, resulting in the problem of difficulty in casing the engine and the motor in the present ship form.

In order to address such a problem, a hybrid type marine propulsion device utilizing both the driving force of a main engine and the driving force of a motor has been proposed.

The marine propulsion device disclosed in Patent Literature 1 is, for instance, a kind of the so-called conventional type marine propulsion device in which a main engine, a speed reducer and a propeller shaft are arranged in a line, and the driving force of the main engine drives a propeller through the speed reducer. This marine propulsion device has a speed reducing reverse gear provided in the interior with a complicated speed reducing and reversing mechanism including a clutch, a gear and the like, in which a propeller is driven by a prime mover and one of a motor and a motor generator or both thereof, so that the output of the prime mover is efficiently used, and the emission of exhaust gas is decreased to realize low vibration and low noise.

On the other hand, the marine propulsion device disclosed in Patent Literature 2 has a configuration in which a main engine is connected through a clutch to a propulsion device including a propeller and a speed reducer, and also an electric propulsion motor is direct-coupled thereto, and further a generator is direct-coupled to the opposite side to the propulsion device of the main engine, so that during high-speed navigation, the propulsion device is driven only by the main engine, and during low-speed navigation, the propulsion device is driven only by the electric propulsion motor and the generator is driven by the main engine. Thus, it is possible to provide a marine hybrid propulsion system, which may realize high function of the main engine driving generator and miniaturization of the motor for auxiliary machinery, and remarkably reduce the equipment cost.

CITATION LIST

Patent Literature

[Patent Literature 1] JP-A No. 2001-270495
[Patent Literature 2] JP-A No. 2007-284018

SUMMARY OF INVENTION

Technical Problem

According to the marine propulsion device described in Patent Literature 1, however, a complicated and expensive speed reducing reverse gear including a clutch, a gear and the like is needed, which causes the problem of high manufacture costs.

According to the marine propulsion device described in Patent Literature 2, one main engine should be equipped with a generator and a motor, respectively, resulting in the problem that the system becomes expensive.

This invention has been made to address the problems of the related art and it is an object of the invention to provide a marine propulsion device, which may facilitate assembling to a ship, lower the manufacturing cost, and have high reliability, and realize efficient drive control appropriate to the load state of the ship to reduce fuel consumption by adopting a simple and compact configuration in which a main engine and a motor are connected to a propulsion system not through a complicated speed reducing mechanism in the so-called azimuth thruster type marine propulsion device adapted to set the propulsion direction by revolving a propeller shaft around a vertical shaft for transmitting power.

Solution to Problem

A marine propulsion device described in claim 1 includes: a power transmission clutch provided on an input shaft to transmit the driving force from a main engine; a horizontal input/output shaft, one end side of which is connected to the input shaft through the power transmission clutch; a vertical shaft, one end side of which is connected to the substantially central part of the input/output shaft through a first turning mechanism; a horizontal propeller shaft, one end side of which is connected to the other end side of the vertical shaft through a second turning mechanism; and a propeller fitted to the other end side of the propeller shaft, in which the propeller is driven by the main engine to propel a ship, and the propeller shaft and the propeller are revolved around the vertical shaft to set a propulsion direction of the ship, wherein a motor generator is connected directly to the other end side of the input/output shaft.

The marine propulsion device described in claim 2 is characterized in that in the marine propulsion device as described in claim 1, a base part, in which the power transmission clutch, the input/output shaft and the first turning mechanism are mounted on a top face side thereof and the vertical shaft is provided to penetrate the top face, is fitted to a bottom of the ship, and the motor generator is integrally mounted to an upside of the base part.

The marine propulsion device described in claim 3 is characterized in that the marine propulsion device as described in claim 1 or 2 includes a control unit, which propels the ship in a propulsion mode selected from motor propulsion in which with the power transmission clutch put in a disengaged state, the motor generator is driven as a motor and hybrid propulsion in which with the power transmission clutch put in the connecting state, the motor generator is used as a motor or a generator while the drive is performed by the main engine.

The marine propulsion device described in claim 4 is characterized in that the marine propulsion device as described in claim 3, includes a two-way inverter connected to a power supply to control the motor generator, further, a controller as the control unit:

performs operation on receiving input of a steering wheel command signal output by a ship operator's handling a steering wheel to designate the number of revolutions of the propeller and load information on the main engine, outputs a mode select signal for setting a control mode of the motor generator to a revolution number control mode or a torque control mode and an inverter command signal for driving the motor generator in the selected control mode to the two-way inverter according to the arithmetic result, further outputs a clutch control signal for putting the power transmission clutch in the connecting state or the disengaged state to the power transmission clutch and further outputs a governor command signal for giving a command of revolution number of the main engine to the main engine, to thereby control the motor generator in the revolution number control mode in the motor propulsion, and control the main engine and control the motor generator in the torque control mode in the hybrid propulsion.

The marine propulsion device described in claim 5 is characterized in that the marine propulsion device as described in claim 4 includes a power generation engine and a condensed discharge mechanism as the power supply.

The controller monitors a depth of charging of the condensed discharge mechanism on receiving charging depth information from the condensed discharge mechanism, and stops charging of the condensed discharge mechanism according to a charge/discharge control signal given to the condensed discharge mechanism when the charging depth of the condensed discharge mechanism exceeds a predetermined value, and also controls the motor generator controlled in the torque control mode through the two-way inverter so that the torque becomes zero to avoid the overcharge of the condensed discharge mechanism.

Effect of the Invention

According to the marine propulsion device as described in claim 1, the so-called azimuth thruster adapted to set the propulsion direction by revolving the horizontal propeller shaft around the vertical shaft for transmitting the power adopts the structure in which the main engine is connected only to one end side of the input/output shaft of the azimuth thruster through the single power transmission clutch without interposing a complicated speed reducing mechanism, and the motor generator is direct-coupled to the other end side. Therefore, a simple and compact-sized configuration can be realized and assembling to the ship can be facilitated to reduce the manufacturing cost. Furthermore, even when one of the main engine and the motor generator is broken, the operation can be performed without a hindrance, and the clutch is only one power transmission clutch, being simple without a speed reducer, so that the reliability as the marine propulsion device is high. Furthermore, since adopted is a hybrid system in which a power source as the propulsion device is combination of the main engine and the motor generator, the efficient drive control fit for the load state of the ship can be realized to reduce fuel consumption, lower the output of the main engine and enable downsizing. With this advantage, the running cost and the greenhouse gas emission amount can be reduced, and in addition, the degree of freedom in layout can be heightened by downsizing.

According to the marine propulsion device as described in claim 2, the motor generator is fixed directly to the base part, which is mounted at the bottom of the ship and to which the horizontal input/output shaft is fitted, and the motor generator is direct-coupled to the other end side of the input/output shaft, so that the configuration as the whole device is further compact-sized. Furthermore, in performing the operation for installing the marine propulsion device in the ship in a shipyard, it will suffice to mount the base part at the bottom of the ship and connect the main engine of the ship to the driving force transmission clutch, so the operation is simple. That is, apart from the operation for mounting the base part at the bottom of the ship, it is not necessary to mount the motor generator at a required position of the bottom of the ship or again connect the same to the input/output shaft on the base part, and therefore the man-hour can be decreased to realize further reduction in manufacturing cost.

According to the marine propulsion device as described in claim 3, in the motor propulsion, the slip control conducted in the low-speed drive state of the main engine is not needed, so that generation of heat and power loss in the power transmission clutch caused by the slip control can be reduced. Further, in the case of stopping the main engine in the motor propulsion, the running cost and the greenhouse gas emission amount during that engine stop can be decreased. The motor generator sharing the load with the main engine may drive just for its share of the output, so the motor generator can be miniaturized to be carried integral on the base part of the azimuth thruster without a hindrance. The operation in the low load region of the main engine is decreased, and the operation in the efficient load region is possible so that fuel consumption is improved. In the motor propulsion, since the motor generator is driven as the motor, the torque can be 100% output even in the low rotation state to quickly respond to the propeller load and facilitate fine adjustment. Thus, ship handling performance can be improved. In the hybrid propulsion, while the propeller drive having good transmission efficiency is performed by the main engine, the motor generator can be used as the motor or the generator according to the load state, so that in acceleration, torque assist can be obtained from the motor generator acting as a motor. In cruising and deceleration, the motor generator acting as a generator performs power generation to thereby charge the condensed discharge mechanism such as a battery provided at need, and surplus energy can be recovered.

According to the marine propulsion device as described in claim 4, the main engine and the two-way inverter are integrated-controlled by the controller to thereby smoothly switch between the motor generator and the main engine. In the motor propulsion, the motor generator is speed-controlled to thereby enable fine ship handling in the low speed region, and in the hybrid propulsion, while the output of the main engine is taken as base load, the controller controls the motor generator as a motor according to the ship running state, thereby assisting the main engine, or the motor generator is acted as the generator to generate power with surplus energy.

Thus, efficient ship running is enabled according to the load state. In addition, since the main engine can be operated in the efficient region, fuel consumption can be reduced.

According to the marine propulsion device as described in claim 5, the power to the motor can be supplied from the generation engine and the condensed discharge mechanism, so that the capacity of the generation engine can be made smaller than the capacity of the motor generator, and compactness can be realized by downsizing. Further, the power supply is given redundancy so that even when one is broken, the operation can be performed without a hindrance.

The controller always monitors the charging depth of the condensed discharge mechanism, and when it reaches a certain charging depth or more, generation from the motor generator is paused to avoid overcharge.

BRIEF DESCRIPTION OF THE DRAWINGS

FIG. 3 is a diagram showing the control state of each part in the respective operating conditions of the marine propulsion device according to the first embodiment of the invention;

MODE FOR CARRYING OUT THE INVENTION

1. First Embodiment

A marine propulsion device according to a first embodiment is an azimuth thruster adapted to set the propulsion direction by revolving a horizontal propeller shaft around a vertical shaft for transmitting power, which particularly enables propulsion with a motor generator simplex, propulsion with a main engine simplex, and hybrid propulsion in which assist of the motor generator is given to the output of the main engine by connecting a main engine and a motor generator to both ends of a horizontal input/output shaft of the azimuth thruster, respectively.

Figure 1:
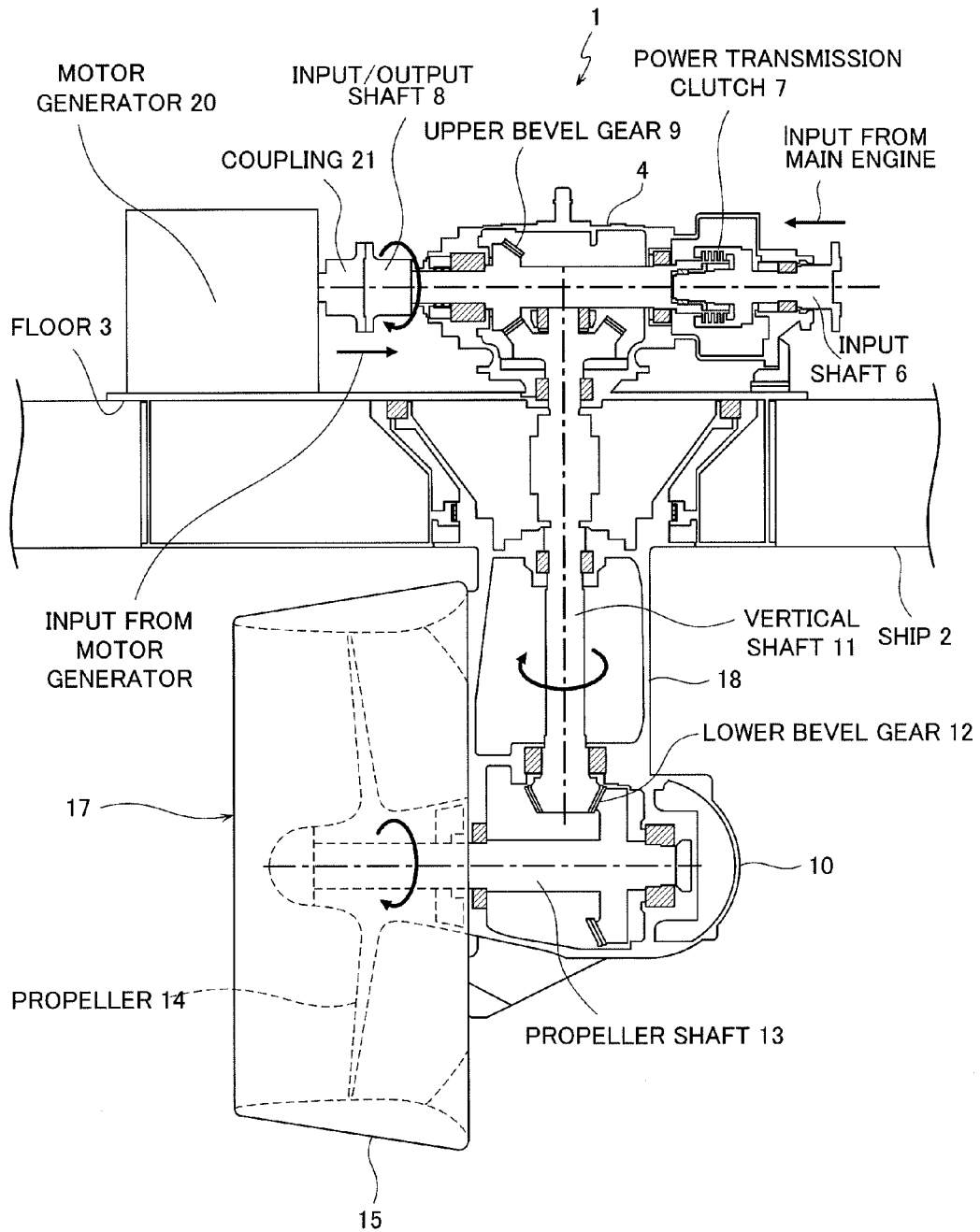
FIG. 1 is a sectional view showing the principal part of a propulsion mechanism in a marine propulsion device according to a first embodiment of the invention.
Figure 2:
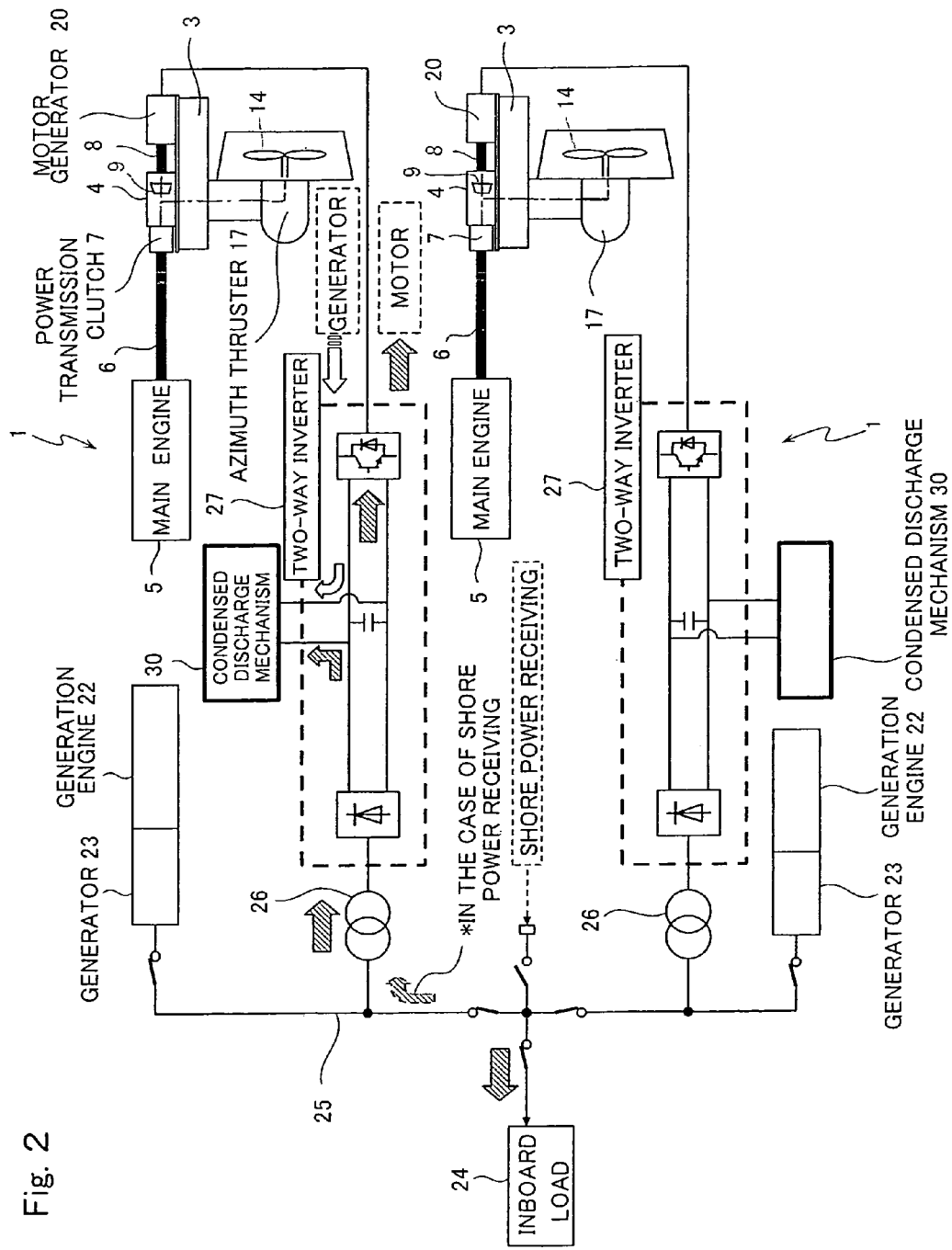
FIG. 2 is a table typically showing the general configuration of the marine propulsion device according to the first embodiment of the invention.

(1) Configuration (FIG. 1 and FIG. 2)

As shown in FIG. 1, in the stern of a ship 2 carrying the marine propulsion device 1 of the embodiment, a floor 3 serving as a base part of an azimuth thruster 17 of the marine propulsion device 1 is fixed at the bottom thereof. A gear case 4 is mounted on the top surface side of the floor 3, and a horizontal input shaft 6 connected to a main engine 5 shown in FIG. 2 to transmit the driving force, a power transmission clutch 7 where the input shaft 6 is connected to the input side, a horizontal input/output shaft 8, one end side of which is connected to the output side of the power transmission clutch 7, and an upper bevel gear 9, which is a first turning mechanism provided at the substantially central part of the input/output shaft 8, are housed in the interior of the gear case 4.

Further, as shown in FIG. 1, a strut 18 and a casing 10 are fitted to the lower surface side of the floor 3 to revolve below the ship 2. The strut 18 and the casing 10 can be revolved by a revolving drive mechanism not shown. One end side (the upper end side) of the vertical shaft 11 is connected to the upper bevel gear 9 in the gear case 4 provided on the top face of the floor 3, and the vertical shaft 11 penetrates through the floor 3 and the bottom of the ship 2 to be disposed in the strut 18 and the casing 10. One end side of a propeller shaft 13 is connected to the other end side (the lower end side) of the vertical shaft 11 through a lower bevel gear 12, which is a second turning mechanism. The other end side of the propeller shaft 13 is projected to the outside of the casing 10, and a propeller 14 is fitted to the other end side of the propeller shaft 13 projected to the outside of the casing 10. The propeller 14 is a fixed-pitch propeller, and a substantially cylindrical duct 15 is fitted to the casing 10 to surround the propeller 14.

Further, as shown in FIG. 1, a motor generator 20, which acts as a motor when electric power is given, and generates electric power as a generator (a generator) when receiving external force to be driven, is mounted integral with the floor 3 on the top surface side of the floor 3. The motor generator 20 is connected directly to the other end side of the input/output shaft 8 through a coupling 21.

According to the present embodiment, the driving force transmission clutch 7 is put in the disengaged state to thereby perform motor propulsion in which the motor generator 20 is driven as a motor to drive the propeller 14 and propel the ship 2, and further the power transmission clutch 7 is put in the connecting state to thereby perform hybrid propulsion in which while driving is performed by the main engine 5, the motor generator 20 is used as a motor or a generator. In both propulsion modes, the casing 10 including the propeller shaft 13 and the propeller 14 is revolved around the vertical shaft 11, thereby optionally setting the propelling direction of the ship 2. This is similar to the conventional azimuth thruster.

According to the present embodiment, as described above, in the marine propulsion device of an azimuth thruster type, the main engine 5 is operatively connected to the one end side of the input/output shaft 8 disposed horizontally through the driving force transmission clutch 7, and the motor generator 20 is operatively connected directly to the other end side of the input/output shaft 8, whereby the main engine 5 and the motor generator 20 are connected to both ends of the input/output shaft 8 and disposed on a single shaft so that the respective driving forces of the main engine 5 and the motor generator 20 can be transmitted from both end sides of the common input/output shaft 8, respectively. Therefore, as compared with the case of adding a motor to the conventional type marine propulsion device in which a speed reducer is put in the connecting state between the main engine and the marine propeller to form a hybrid, it is possible to realize a hybrid azimuth thruster, which is further simple and efficient in structure and hardly causes power loss. Further, since the motor generator 20 is integrally mounted on the floor 3 to form a compact structure, in the fitting operation, it will suffice to mount this device on the ship 2 and connect the same to the main engine 5, so the time and trouble for installing the motor generator 20 separately at a required place in the ship 2 can be saved in fitting.

Although the output of the main engine is determined according to the required output in operation in the conventional propulsion system for the tugboat, the hybrid propulsion system like the present embodiment uses the motor generator 20 as a motor, whereby the output of both the main engine 5 and the motor can be utilized so that the smaller output of the main engine 5 will suffice as compared with the conventional propulsion system. Furthermore, when the output of the main engine 5 is made smaller than the conventional propulsion system, it is possible to reduce the outside diameter of the input shaft 6 and the like to which the output of the main engine 5 is applied. Thus, the manufacturing cost can be reduced.

FIG. 2 is a block diagram typically showing the general configuration of the marine propulsion device 1 including the above azimuth thruster 17. As shown in FIG. 2, the ship in the present embodiment includes two sets of marine propulsion devices 1 including the azimuth thruster 17 and a drive control system, and these sets are arranged on the right and left in the stern of the ship. The details of the control system being mentioned later, the right and left marine propulsion devices 1 can be controlled separately by ship handling means provided on every device.

The marine propulsion device 1 shown in FIG. 2 includes a generation engine 22 in addition to the above main engine 5, wherein a generator 23 is driven by the generating engine 22 to generate electrical power, and the electrical power supplies the electrical power required for an inboard load 24 and the motor propulsion. The electrical power for the motor propulsion is guided from an inboard bus bar 25 connected to the generator 23 through a transformer 26 to a two-way inverter 27, and the variable-speed control over the motor generator 20 as a motor is performed by the number of revolution control or the torque control of the two-way inverter 27.

Further, as shown in FIG. 2, a condensed discharge mechanism 30 is connected to the two-way inverter 27, so that an alternating current from the generator 23 is converted to a direct current to be stored, and also an alternating current supplied from the motor generator 20 is converted to a direct current to be stored when the motor generator 20 acts as the generator. Although the condensed discharge mechanism 30 is capable of supplying electrical power to the motor generator 20 in addition to the supply from the generator 23 driven by the generation engine 22 in driving the motor generator 20 as a motor, it can separately supply the electric power to the motor generator 20 when feeding from the generator 23 is not expected due to some circumstance. Further, in the anchored state and in the shore power receiving state, the condensed discharge mechanism 30 is charged.

Thus, by the hybrid configuration having the main engine 5 and the motor generator 20 as a driving source and including the generating engine 22 and the generator 23 as a power supply and the condensed discharge mechanism 30, even if the operation is impossible due to defect of the main engine 5 or the generating engine 22, the operable engine is utilized to navigate the ship 2 without a hindrance.

(2) Control Operation in Each Operating Condition of Marine Propulsion Device 1 (FIG. 3 to FIG. 8)

In the marine propulsion device 1 according to the present embodiment, as shown in FIG. 3, in the respective operating conditions in ship running, in anchoring, in shore power receiving and in case of emergency, which are listed in longitudinal columns, the respective items such as the number of revolutions of the input/output shaft 8, the operating condition of the main engine 5, the state of the power transmission clutch 7, the operating condition of the motor generator 20, the operating condition of the generating engine 22 and the state of the condensed discharge mechanism 30, which are listed in the lateral columns, are controlled to be the optimum for the respective operating conditions.

Among the above respective operating conditions, the control operation in ship running will be described first.

Figure 4:
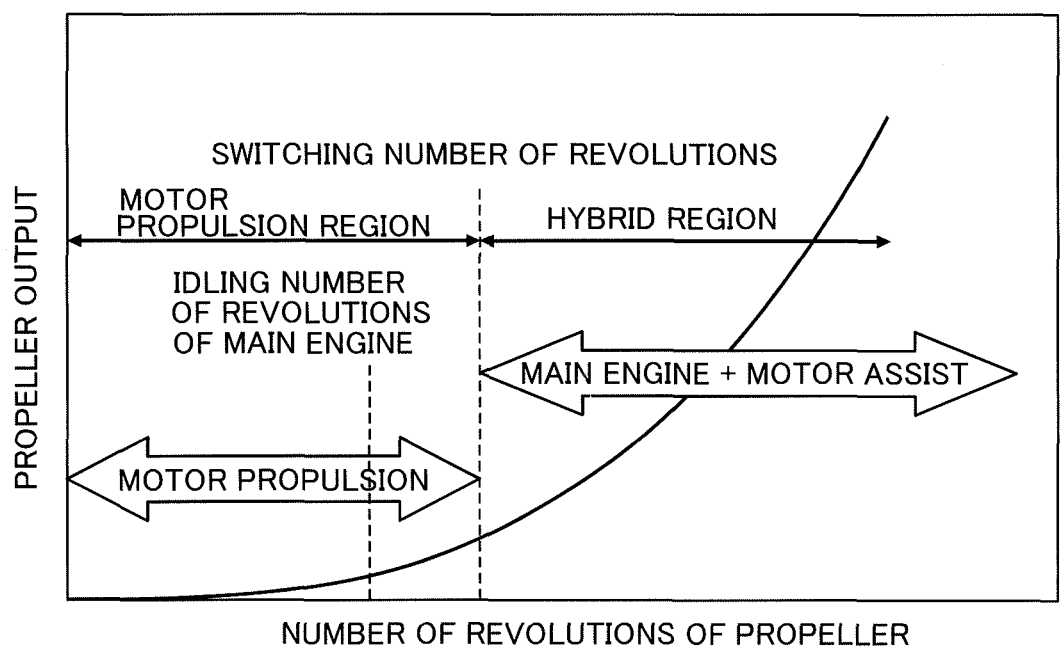
FIG. 4 is a diagram showing the relationship between the number of revolutions of a propeller and the propeller output in a motor propulsion region and in a hybrid propulsion region in the ship running state in the respective operating conditions of the marine propulsion device according to the first embodiment of the invention.

FIG. 4 shows the relationship between the number of revolutions of a propeller and the propeller output of the marine propulsion device 1 in ship running shown in FIG. 3. As shown in FIG. 4, at the point at which the number of revolutions of the propeller 14 reaches a switching predetermined number of revolutions exceeding the idling number of revolutions of the main engine 5, the motor propulsion (a motor propulsion region in FIG. 4) only by the motor generator 20 driven as a motor is automatically switched to the hybrid propulsion (a hybrid region in FIG. 4) by the main engine 5 and the motor assist of the motor generator 20. The switching number of revolutions of this switching may be optionally set according to the convenience in design, the convenience in use of a ship handler and so on.

Figure 5:
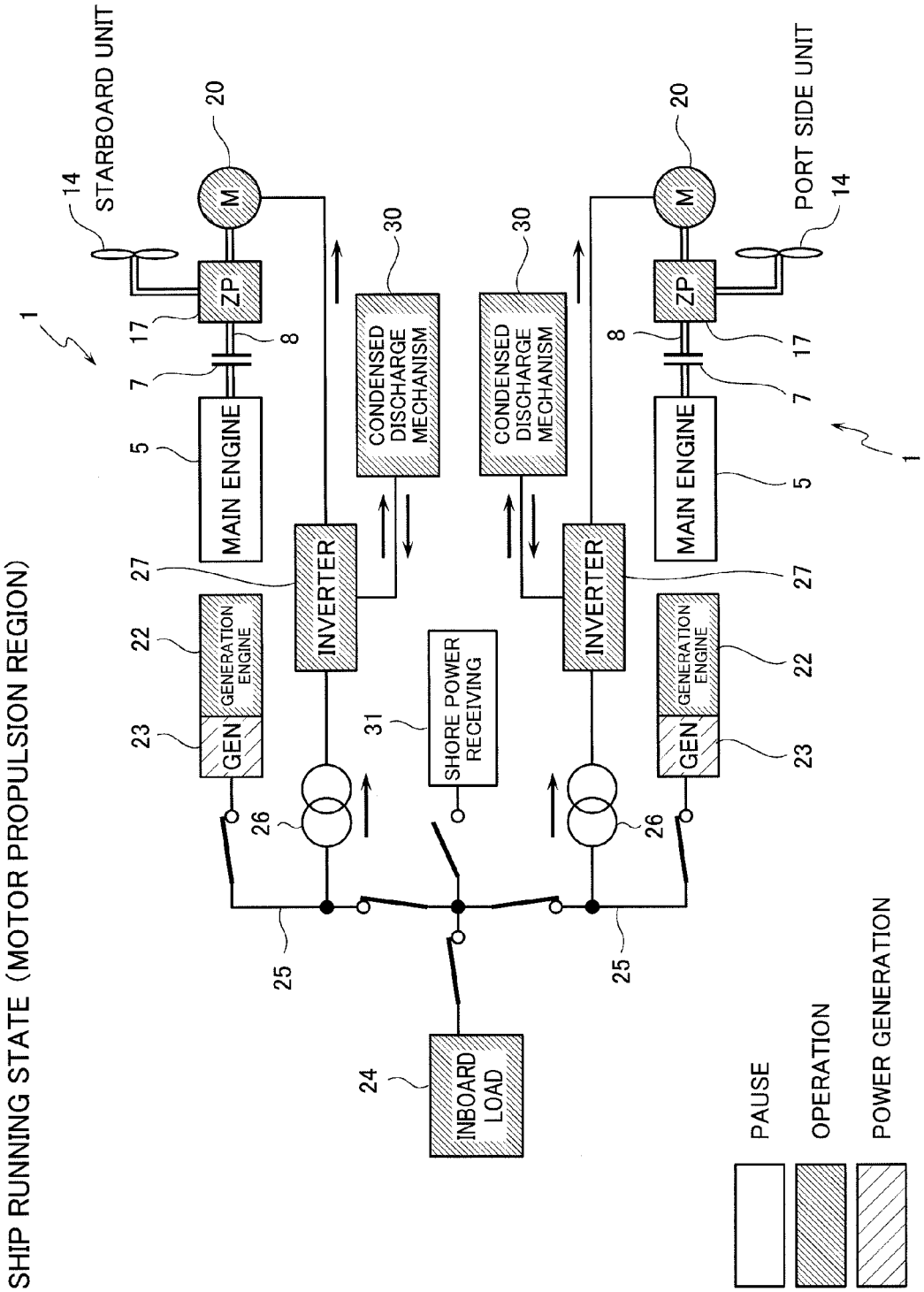
FIG. 5 is a block diagram typically showing the operating conditions of each part in the case where the marine propulsion device according to the first embodiment of the invention is controlled in the motor propulsion region in the ship running state.

First, as shown in FIG. 4 and FIG. 5, a motor propulsion region in which the number of revolutions of the propeller is equal to or less than the switching number of revolutions will be described. In this motor propulsion region, with the power transmission clutch 7 put in the disengaged state, the motor generator 20 is speed-controlled as a motor, and the input/output shaft 8 is rotated by the motor generator 20 as a motor to perform propulsion. When regeneration occurs in this motor propulsion region, the condensed discharge mechanism 30 stores electrical power.

According to the conventional azimuth thruster, as described above, the slip control is conducted by the power transmission clutch in a region where the number of revolutions of the propeller is equal to or less than the idling number of revolutions of the main engine 5. In this control method, however, the propeller shaft cannot be rotated in the whole region equal to or less than the idling number of revolutions.

On the contrary, in the azimuth thruster 17 for the hybrid propulsion system according to the present embodiment, the drive is performed by the speed-controlled motor (the motor generator 20) in the whole region equal to or less than the switching number of revolutions, so that the propeller shaft 13 can be rotated in the whole region from the static state to the switching number of revolutions to enable fine handling of the ship by the motor.

In this case, the main engine 5 can be put in the idling state, and be stopped as well. When the main engine 5 is stopped, the running cost and the greenhouse gas emission amount can be reduced to contribute to decrease in environmental load. Even when the main engine 5 is put in the idling state, loss due to the slip control in the power transmission clutch 7 is not caused so that energy saving effect can be obtained.

Figure 6:
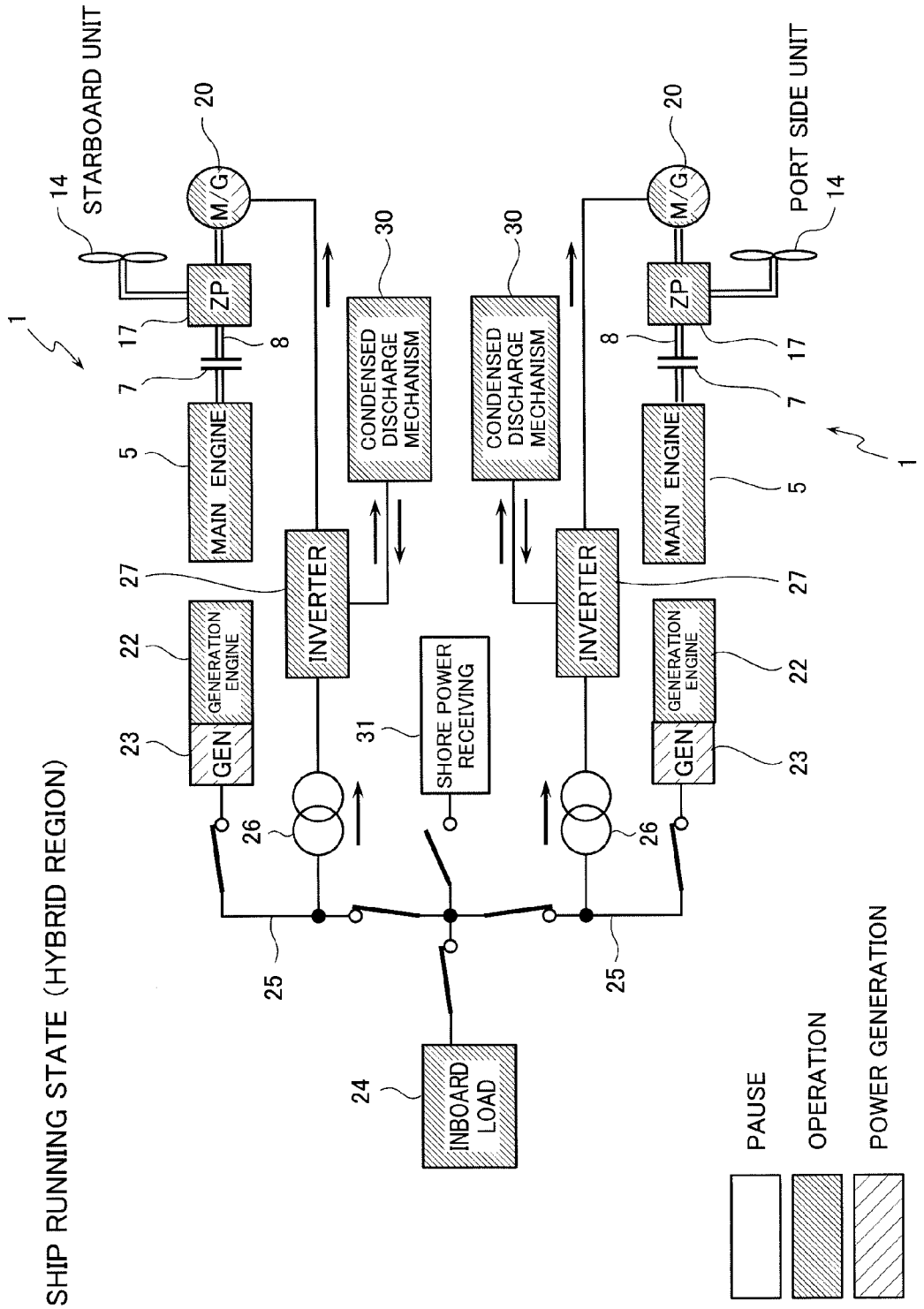
FIG. 6 is a block diagram typically showing the operating conditions of each part in the case where the marine propulsion device according to the first embodiment of the invention is controlled in the hybrid propulsion region in the ship running state.

The hybrid region in which the number of revolutions of the propeller is equal to or more than the switching number of revolutions as shown in FIG. 4 and FIG. 6 will now be described. In this hybrid region, with the power transmission clutch 7 put in the connecting state, high efficient propulsion is performed using the main engine 5. In the hybrid region, the motor generator 20 acts as a motor when a comparatively large output is required to assist the propulsion of the main engine 5, or acts as a generator when only comparatively small output is required to perform power generation.

Figure 7:
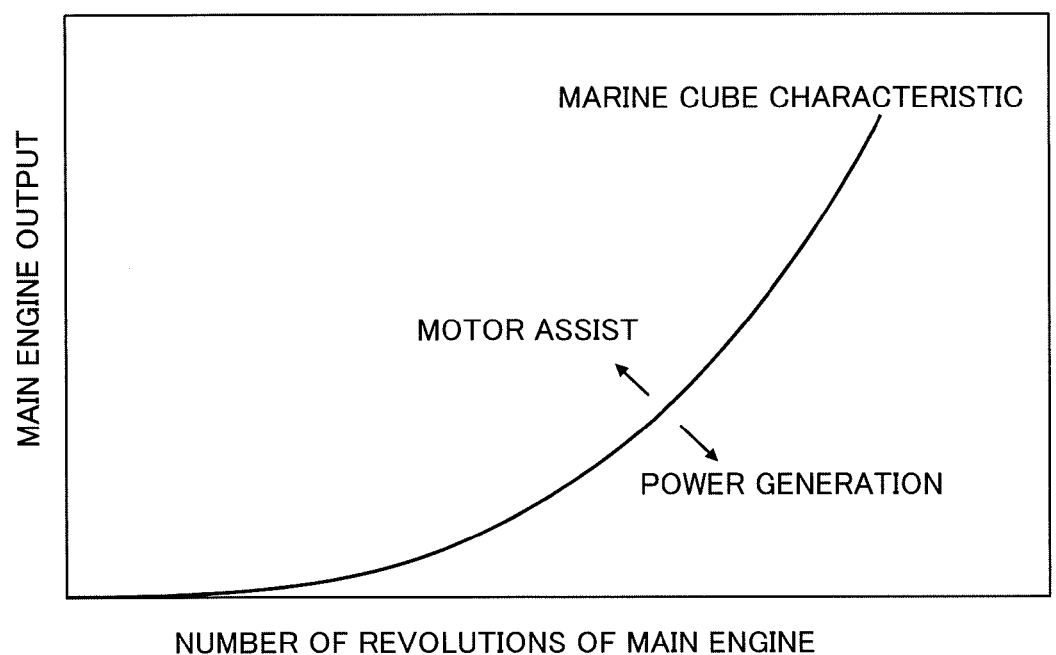
FIG. 7 is a diagram showing a marine cube characteristic, which is the relationship between the main engine rotating speed and the main engine output in the case where the marine propulsion device according to the first embodiment of the invention is controlled in the hybrid propulsion region in the ship running state.
Figure 8:
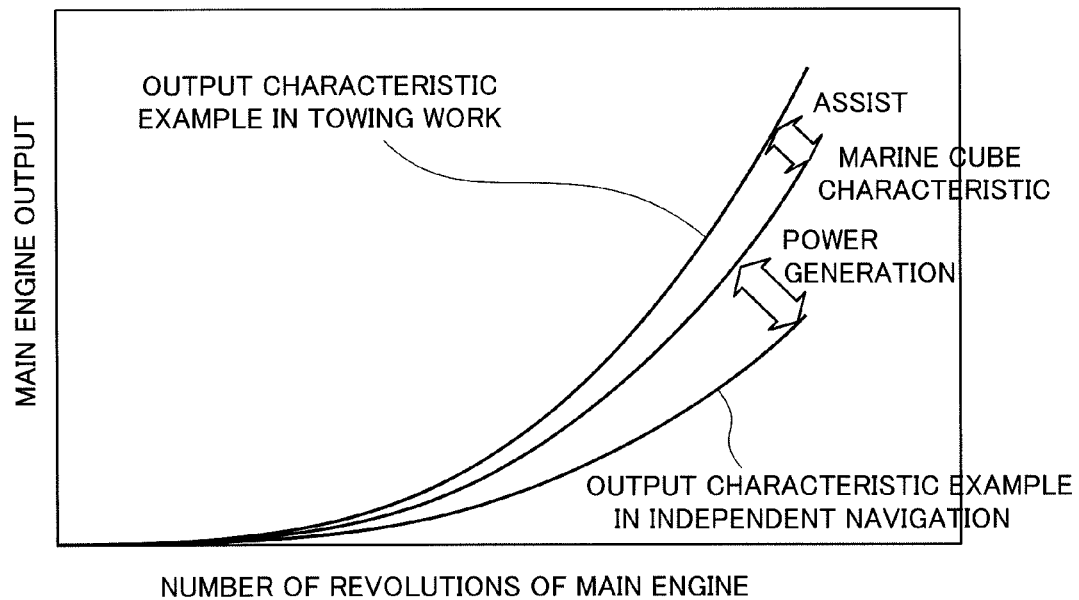
FIG. 8 is a diagram showing the marine cube characteristic, the output characteristic in towing work when the assist of the motor generator is received, and the output characteristic in the independent state by the relationship between the number of revolutions of the main engine and the main engine output in the case where the marine propulsion device according to the first embodiment of the invention is controlled in the hybrid propulsion region in the ship running state.

The control in the hybrid region will be described further concretely. As illustrated in FIG. 7, the main engine for the general ship has marine cube characteristic in which the output of the main engine is proportional to the cube of the number of revolutions. As compared with the output of the main engine 5 having such marine cube characteristic, as shown in FIG. 8, when the load is higher like the output characteristic case in towing work, the motor is torque-controlled to assist the output of the main engine 5. When the output of the main engine 5 is assisted, although the number of revolutions as the propeller 14 does not change, the torque is increased for the above assist. Further, as shown in FIG. 8, when the load is lower than the marine cube characteristic like the output characteristic case in independent navigation, in the case where the charging depth of the condensed discharge mechanism 30 allows charging, the motor generator 20 is used as the generator to charge the condensed discharge mechanism 30.

Thus, when the load to the main engine 5 is higher as in the accelerating state, the motor generator 20 is driven as a motor to perform assisting, and when the load to the main engine 5 is lower as in the cruising state and in the decelerating state, the condensed discharge mechanism 30 may be charged to recover surplus energy.

Next, as shown in FIG. 3, in the anchored state, the main engine 5 and the motor generator 20 are stopped, and the power transmission clutch 7 is put in the disengaged state. The generation engines 22, although depending on the required electrical power, generally cover the inboard load 24 by operating at least one generating engine and also charge the condensed discharge mechanism 30.

As shown in FIG. 3, in the shore power receiving state, in the shore power receiving state, similarly to the above anchored state, the main engine 5 and the motor generator 20 are stopped, and the power transmission clutch 7 is put in the disengaged state. Further, the generation engines 22 is also stopped, and the shore power receiving 31 is connected to the inboard bus bar 25 to cover the inboard load 24 and charge the condensed discharge mechanism 30.

In case of emergency, as shown in FIG. 3, the main engine 5 is operated, the power transmission clutch 7 is put in the connecting state, the number of revolutions of the input/output shaft 8 is set equal to or more than the idling number of revolutions, the motor generator 20 is stopped, only one of the generating engines 22 is operated, and the condensed discharge mechanism 30 is not used.

Figure 9:
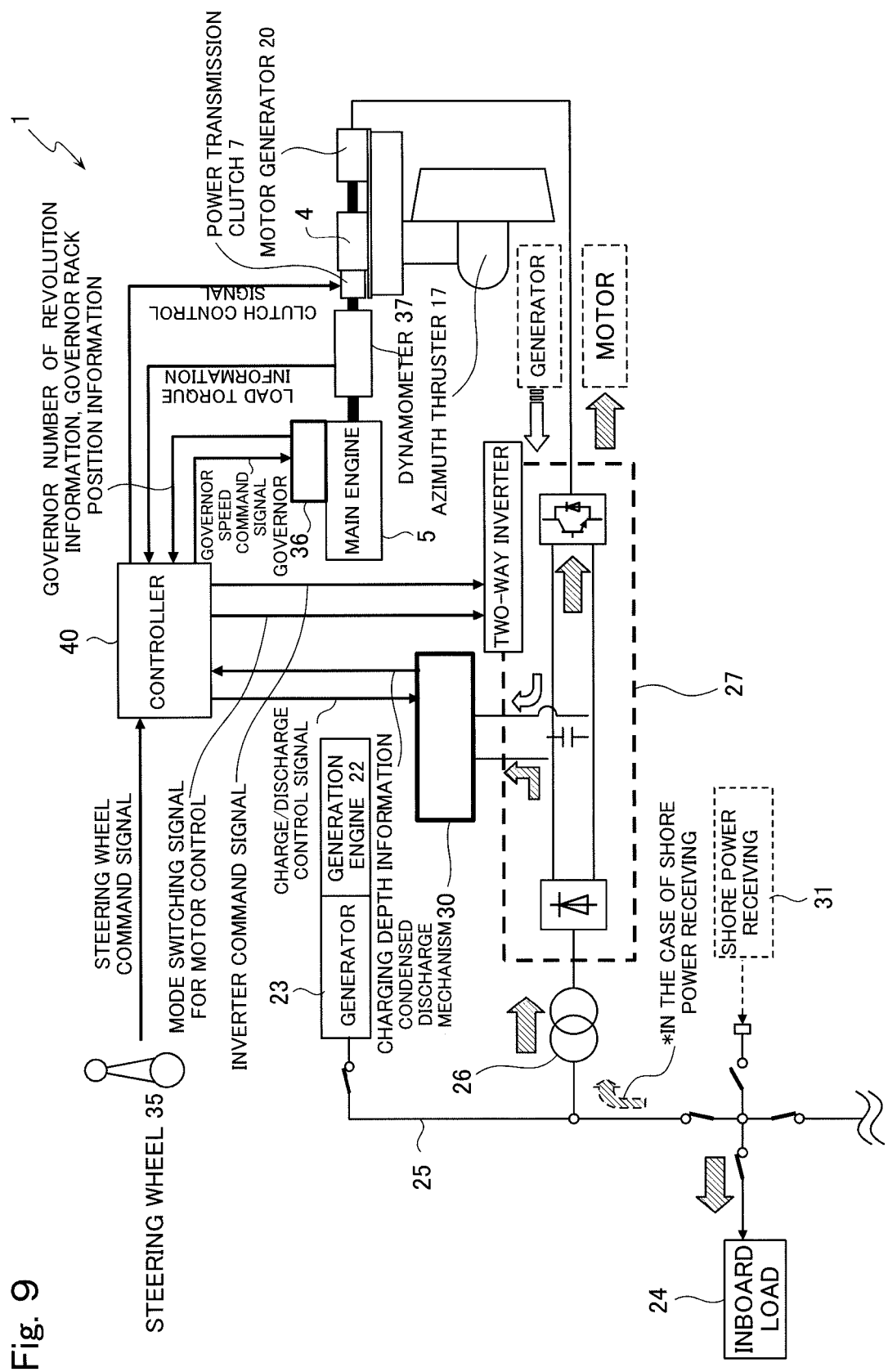
FIG. 9 is a control system diagram particularly showing the configuration of a control system in the general configuration of the marine propulsion device according to the first embodiment of the invention.

(3) Configuration of Control System (FIG. 9)

The control system in the marine propulsion device 1 according to the present embodiment is shown in FIG. 9. As shown in FIG. 9, the marine propulsion device 1 according to the present embodiment includes a steering wheel 35 for handling a ship and a controller 40 as the control unit for suitably switching the above motor propulsion and the hybrid propulsion. As described before with reference to FIG. 2, in the present embodiment, the marine propulsion devices 1 including the azimuth thruster 17 and the drive control system are provided on the right and left of the stern of the ship 2, respectively, and the steering wheel 35 and the controller 40 are also provided on the right and left marine propulsion devices 1 each, whereby the respective right and left sets of marine propulsion devices 1 can be controlled independently of each other by separate steering wheels 35.

As shown in FIG. 9, the controllers 40 for controlling the main engines 5 and the two-way inverters 27 always acquire a steering wheel command signal from the steering wheels 35 and the load information and the revolution number information about the main engines 5. The steering wheel command signal is output corresponding to the number of revolutions of the propeller 14 to be designated by a ship handler's operation of the steering wheel 35 to designate the number of revolutions of the propeller 14. As the revolution number information about the main engine 5, the governor revolution number information from a governor 36 provided on the main engine 5 can be used. As the load information about the main engine 5, the governor rack position information from the governor 36 provided on the main engine 5 or the load torque information output by a dynamometer 37 provided between the main engine 5 and the power transmission clutch 7 can be used. As the load information, between the above two kinds of information, at least one kind of information will suffice for it, and if information shows the load of the main engine 5, any other information may suffice.

The controller 40 performs operation based on the steering wheel command signal and the load information about the main engine 5, and according to the arithmetic result, various kinds of control signals described in the following are output to the respective parts of the marine propulsion device 1.

The controller 40 outputs a mode switching signal for setting the control mode for the motor generator 20 in a revolution number control mode or in a torque control mode, and an inverter command signal for driving the motor generator 20 in the selected control mode to the two-way inverter 27. The controller 40 outputs a clutch control signal for putting the power transmission clutch 7 in the connecting state (ON) or in the disengaged state (OFF) to the power transmission clutch 7. Further, the controller 40 outputs a governor speed command signal for giving a command for the number of revolutions of the main engine 5 to the governor 36 of the main engine 5.

In the motor propulsion region, the controller 40 outputs a control mode signal for the speed control to the two-way inverter 27, and a clutch control signal for putting the clutch in the off state to the power transmission clutch 7, thereby putting the clutch in the disengaged state. In this state, corresponding to a change of the steering wheel command signal caused by the operation of the steering wheel 35, an inverter command signal for designating an increase in number of revolutions is output to the two-way inverter 27, and a governor speed command signal is output as still zero to the governor 36 of the main engine 5, thereby performing the motor propulsion control in which the main engine 5 is stopped and the motor generator 20 is separately operated as a motor.

In the motor propulsion region, when the steering wheel 35 is operated for the speed control, the number of revolutions of the propeller shaft 13 changes in proportion to the actuating amount. When the number of revolutions of the propeller 14 corresponding to the steering wheel command signal from the steering wheel 35 reaches a switching predetermined number of revolutions, a governor speed command signal to reach the switching number of revolutions is output from the controller 40 to the governor 36 of the main engine 5, and after confirming that the main engine 5 and the motor reach the same speed, a clutch control signal for putting the clutch in the on state is output to the power transmission clutch 7 to put the clutch in the connecting state, and a control mode signal for the torque control is output to the two-way inverter 27 to switch the control region from the motor propulsion region to the hybrid region.

In the hybrid region, when the ship handler operates the steering wheel 35 for the speed control, a steering wheel command signal proportional to the actuating amount is input to the controller 40, and the controller 40 outputs a governor speed command signal to give a command for an increase in number of revolutions to the governor 36 of the main engine 5 corresponding to the steering wheel command signal. Thus, the number of revolutions of the main engine 5 is changed in proportion to the actuating amount from the steering wheel 35 to thereby control the number of revolutions of the propeller 14.

The controller 40 outputs an inverter command signal for a torque command computed by the controller 40 to the two-way inverter 27, and causes the motor generator 20 to assist or generate power according to the torque command value.

Thus, the controller 40 conducts the integrated control over the main engine 5 and the two-way inverter 27 to smoothly cause the transition from the propulsion by the motor in the motor propulsion region to the propulsion mainly performed by the main engine 5 in the hybrid propulsion. Further, the main engine 5 can be operated in the efficient region of comparatively high engine speed to reduce fuel consumption.

The operational switching between the motor assist of the motor generator 20 and the power generation in the above hybrid region is performed as follows.

In the marine cube characteristic of the main engine 5 shown in FIG. 7, when the load is lower than the marine cube characteristic of the main engine 5, the controller 40 computes "the load output−the output of the main engine" to be on the minus (−) side. Therefore, when an inverter command signal, which is a minus torque command, is output to the two-way inverter 27, the motor generator 20 acts as "the generator", so that the condensed discharge mechanism 30 can be charged with the generated electricity.

When the load is higher than the marine cube characteristic of the main engine 5, the controller 40 computes "the load output−the output of the main engine" to be on the plus (+) side. Therefore, when an inverter command signal is output to the two-way inverter 27, the motor generator 20 acts as "the motor", so that the torque assist to the propulsion output of the main engine 5 is enabled.

The output characteristic of the main engine 5 is known in advance, so that when the characteristic is mapped into the controller 40, ship running according to the used load is enabled by performing the above comparison operation in the controller 40 according to the present load output.

(4) Supply of Power (FIG. 2, FIG. 9 and so on)

Referring to FIG. 2, FIG. 9 and so on, as clear from the above description, the marine propulsion device 1 according to the present embodiment is configured so that the power for driving the motor generator 20 can be supplied from both of the generation engine 22 and the condensed discharge mechanism 30. The condensed discharge mechanism 30 is utilized to make the capacity of the generation engine 22 smaller than the total of the respective maximum powers of the motor propulsion and the inboard load 24. Since the power required for the motor propulsion is insufficient in the high-load state, power is supplied from the condensed discharge mechanism 30 connected to the two-way inverter 27, and in the low-load state and at the occurrence of regeneration, the condensed discharge mechanism 30 is charged. Thus, as compared with the complete electric propulsion system, smaller capacities of the motor and the two-way inverter 27 may suffice and the installation area can be reduced, so that the hybrid system according to the present embodiment can be put into practical use without requiring alterations in ship form.

(5) Charge/Discharge Control (FIG. 9)

As shown in FIG. 9, in the charge/discharge control over the motor generator 20 of the marine propulsion device 1 according to the present embodiment, the controller 40 always requires the charging depth information from the condensed discharge mechanism 30 to thereby always monitor the charging depth of the condensed discharge mechanism 30, and controls the motor generator 20 not to be used as the generator when reaching a certain charging depth or more. To be concrete, the controller 40 outputs a charge/discharge control signal to give an instruction for stopping of charging to the condensed discharge mechanism 30, and controls the motor generator 20 controlled in the torque control mode through the two-way inverter 27 so that the torque becomes zero. Thus, power generation by the motor generator 20 is stopped, and the charging operation of the condensed discharge mechanism 30 is also stopped, so that damage or the like of the condensed discharge mechanism 30 due to overcharge can be surely avoided.

As clear from the above description about the first embodiment, according to the present embodiment, the similar effects to the effect of the inventions as claimed in claims 1 to 6 described in the column "Effect of the Invention" can be obtained in the forms corresponding to the respective configurations according to the respective inventions.

2. Second Embodiment

Figure 10:
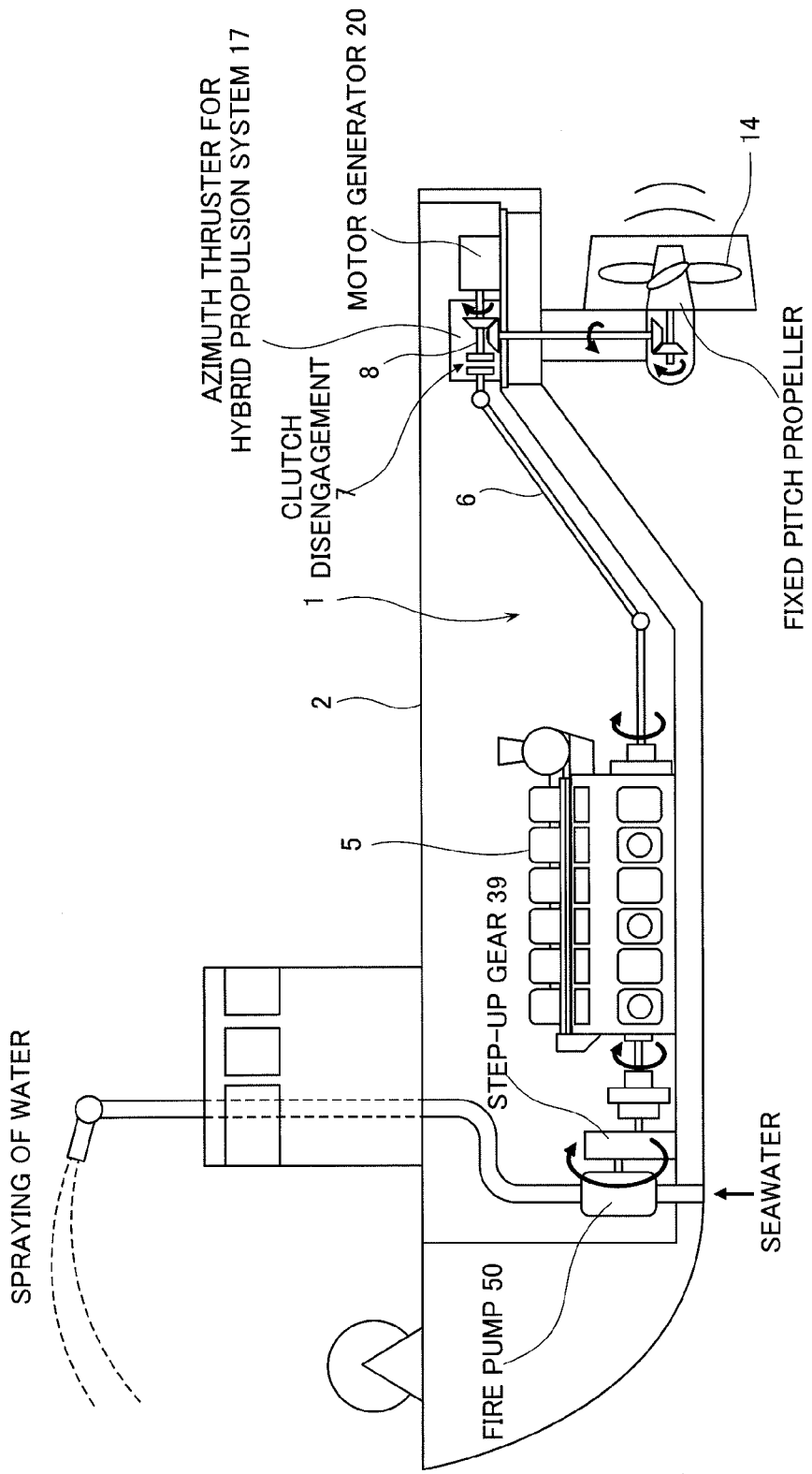
FIG. 10 is a diagram showing the generation configuration of a ship including a marine propulsion device according to a second embodiment of the invention and a fire pump.
Figure 11:
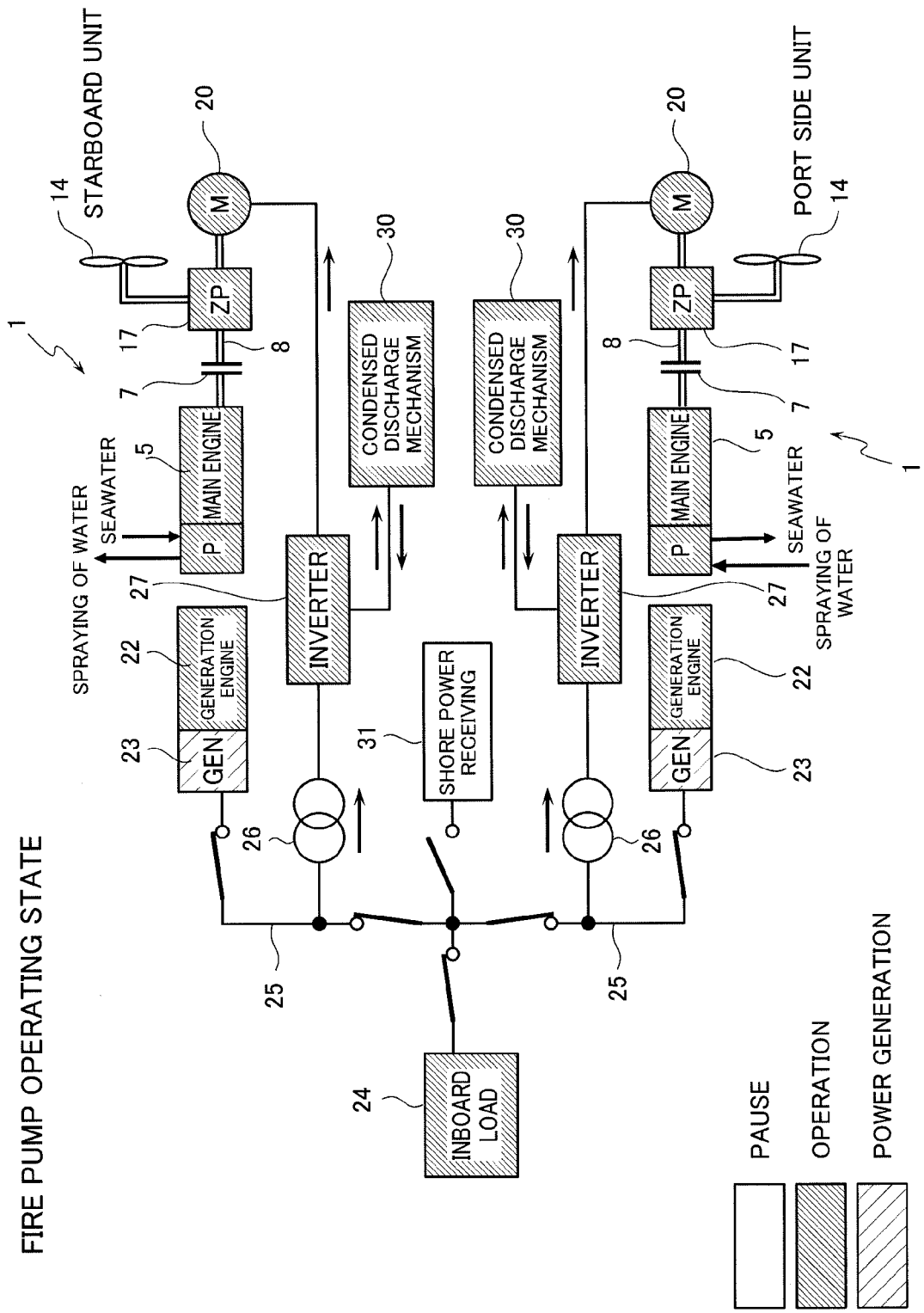
FIG. 11 is a block diagram typically showing the operating conditions of each part in the case where the marine propulsion device according to the second embodiment of the invention is controlled for the fire fighting actuation.

FIG. 10 and FIG. 11

A second embodiment relates to a ship 2 including a marine propulsion device 1 similar to the first embodiment and further carrying a fire pump. In the description of the present embodiment, concerning the same or like parts as those of the first embodiment, the description in the first embodiment is quoted to suitably eliminate the description by using the same reference signs as those in the drawings of the first embodiment.

As shown in FIG. 10, in the marine propulsion device 1 mounted on the ship 2 according to the present embodiment, the main engine 5 is connected to one end side of the horizontal input/output shaft 8 of the azimuth thruster 17 (an azimuth thruster for a hybrid propulsion system) through the power transmission clutch 7, and the motor generator 20 is connected to the other end side of the input/output shaft 8. The propeller 14 is a fixed pitch propeller, which is simple in structure and inexpensive. A rear end side of a driving shaft of the main engine 5 is connected to the power transmission clutch 7 to utilize the driving force of the main engine 5 for propelling the ship 2, and the front end side thereof is connected to a fire pump 50 through a step-up gear 39 to utilize the driving force of the main engine 5 for spraying of water.

Therefore, in the case of spraying water using the fire pump 50 in the ship 2, as shown in FIG. 10 and FIG. 11, the power transmission clutch 7 is put in the disengaged state, and propulsion is performed only by the motor generator 20 driven as a motor, so that the main engine 5 may be used only for operating the fire pump 50.

Figure 12:
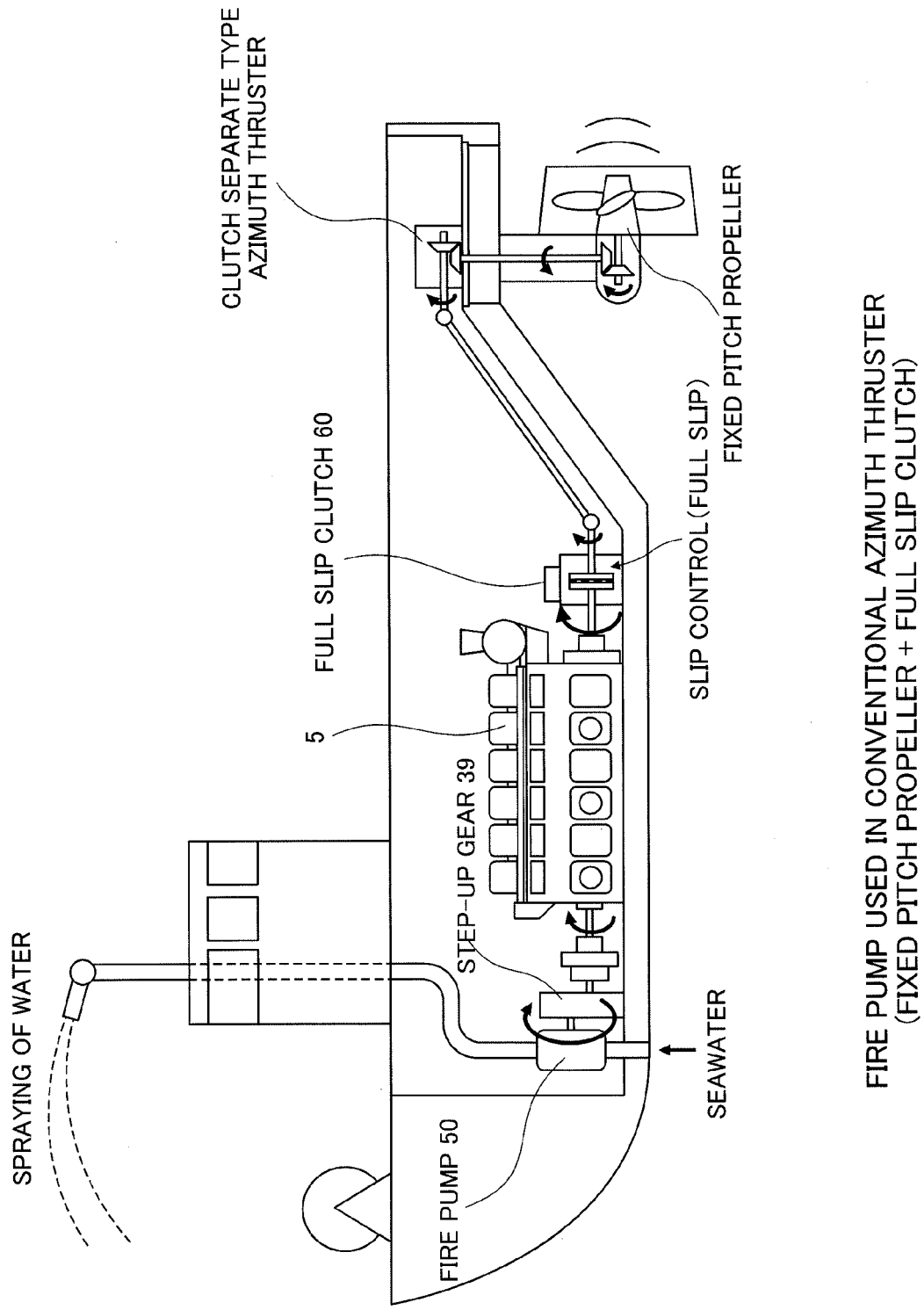
FIG. 12 is a diagram showing the general configuration of the conventional ship carrying the conventional type azimuth thruster, which is a fixed pitch propeller, a full slip clutch and a fire pump.

On the contrary, in the ship including the conventional azimuth thruster (clutch separate type azimuth thruster) as the marine propulsion device as shown in FIG. 12, it is necessary to mount a high-function clutch called a full-slip clutch 60 between the rear end side of a driving shaft of a main engine 5 and the azimuth thruster. In using a fire pump 50, the number of revolutions of the main engine 5 is set to the maximum number of revolutions and constant, the fire pump 50 is rotated through the step-up gear 39 fitted to the front end side of the driving shaft of the main engine 5, and for propulsion, the input of the maximum number of revolutions is slip-controlled by the full-slip clutch 60 at the rear end side of the driving shaft of the main engine 5 to be lowered to the required number of revolutions, and a fixed pitch propeller is driven. In this related art, since the maximum number of revolutions is slip-controlled, not slip-controlling the idling revolution to realize low-speed rotation, among the full-slip clutches 60, which are high-function clutches, especially the larger capacity one is needed, so the marine propulsion device cannot help costing high.

Further, according to the conventional system, in the fire fighting mode using the fire pump 50, as described above, the full slip clutch 60 is slipped at high speed, resulting in the problem of great heat loss. However, according to the present embodiment, such a problem is not caused, and energy loss is small to save energy.

Figure 13:
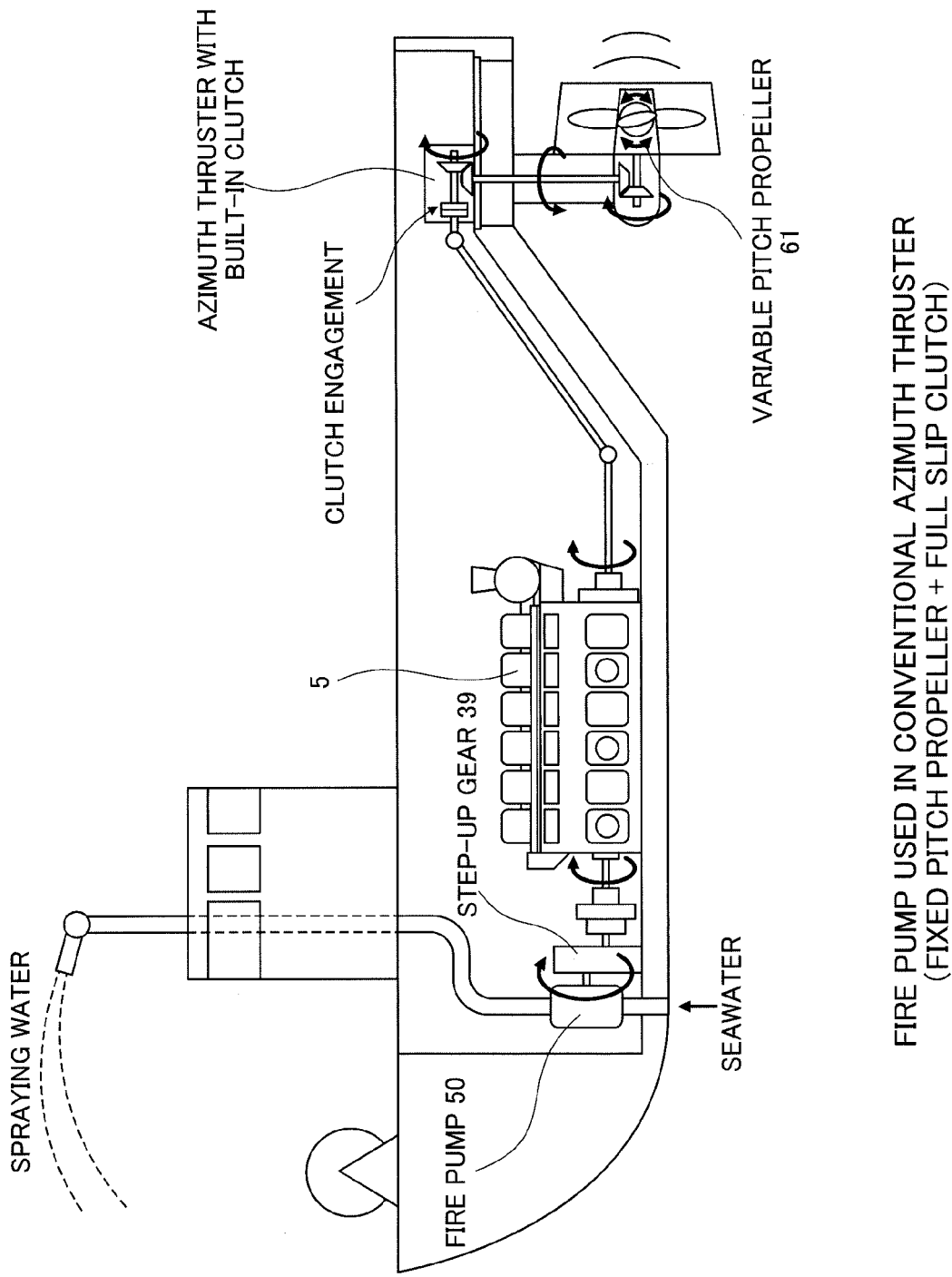
FIG. 13 is a diagram showing the general configuration of the conventional ship carrying the conventional type azimuth thruster, which is a variable pitch propeller, and a fire pump.

Further, as shown in FIG. 13, in a ship including the conventional azimuth thruster (the clutch-contained azimuth thruster) as a marine propulsion device, driven only by the main engine 5 without providing an expensive full slip clutch and without a motor generator, when a variable pitch propeller 61 is provided instead of a fixed pitch propeller, the fire pump 50 is operated by the main engine 5 and simultaneously the propulsion of the ship can be controlled by the control of the variable pitch propeller 61. However, the variable pitch propeller 61 is expensive, and in this structure, the marine propulsion device inevitably becomes expensive.

On the contrary, the marine propulsion device 1 according to the present embodiment is so constructed that propulsion is performed only by the motor generator 20 driven as a motor, and the main engine 5 may be used only for operating the fire pump 50, and the expensive full slip clutch 60 and variable pitch propeller 61 are not needed, so that the manufacturing cost can be reduced as compared with the conventional marine propulsion device as shown in FIG. 12 and FIG. 13.

3. Third Embodiment

FIG. 14

Figure 14:
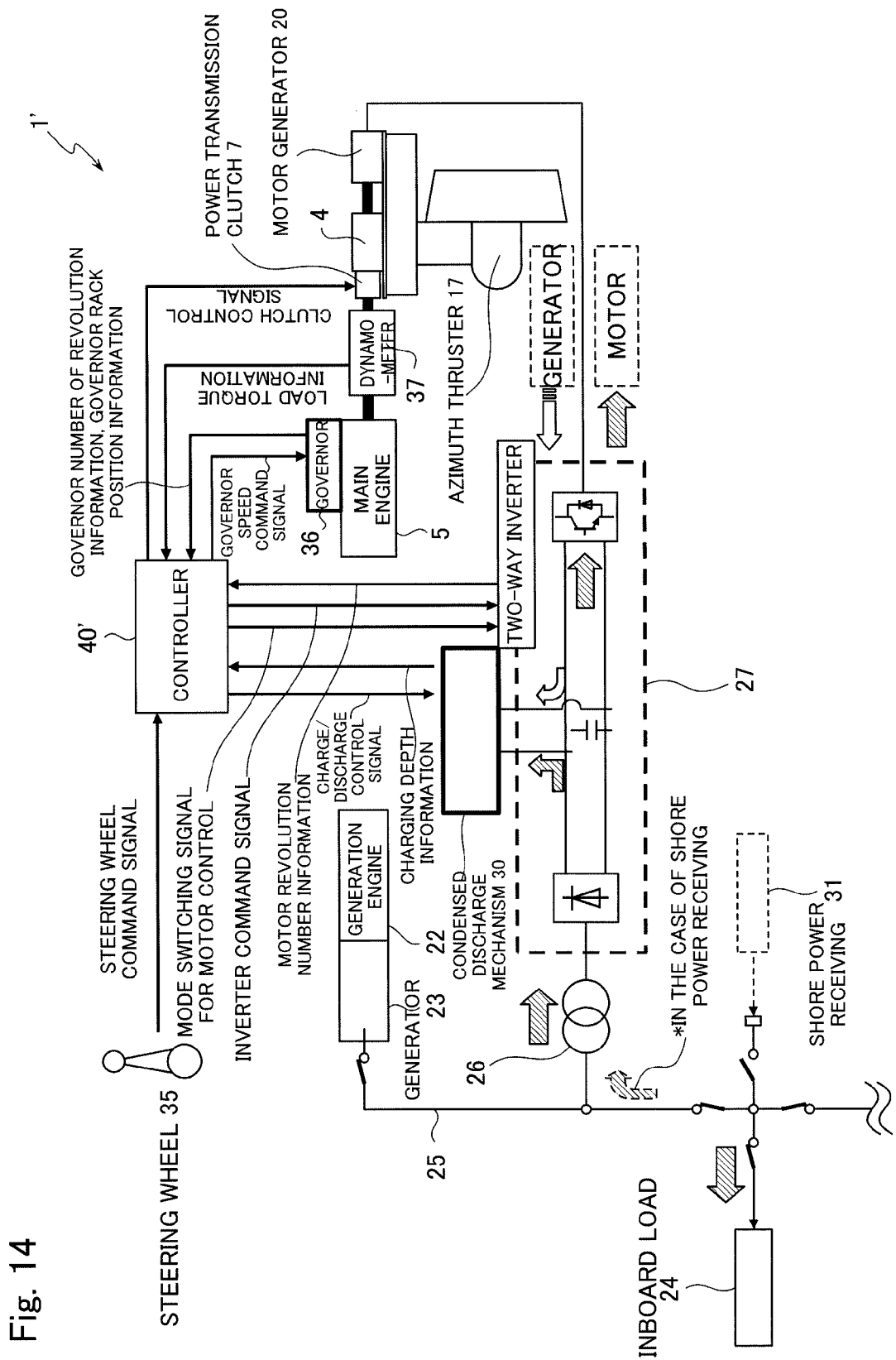
FIG. 14 is a control system diagram showing in particular the configuration of a control system in the general configuration of a marine propulsion device according to a third embodiment of the invention.

FIG. 14 is a control system diagram of a marine propulsion device 1' according to a third embodiment, which improves the first embodiment shown in FIG. 9, and provides a system adapted to input the revolution number information of the motor generator 20 from the two-way inverter 27 to a controller 40'. The substantially same components as those of the first embodiment are designated by the same reference signs as those of FIG. 9 in FIG. 14 to eliminate the description.

In the present embodiment, the controller 40', which controls the main engine 5 and the two-way inverter 27, always acquires information of the number of revolutions of the main engine 5 and the number of revolutions of the motor generator 20. In switching from a motor propulsion region to a hybrid region at a switching predetermined number of revolutions, the controller outputs a clutch control signal for putting a clutch in the on state after confirming that both numbers of revolutions coincide to a power transmission clutch 7 to put the clutch in the connecting state, and outputs a control mode signal of the toque control to the two-way inverter 27 to switch the control region from the motor propulsion region to the hybrid region. Thus, even when a steering wheel command signal from a steering wheel 35 time-varies, the controller always monitors the number of revolutions of the main engine 5 and the number of revolutions of the motor generator 20, and puts the clutch in the connecting state after confirming the coincidence of both numbers of revolutions, whereby switching of the control region can be realized without any shock.

4. Fourth Embodiment

FIG. 15

Figure 15:
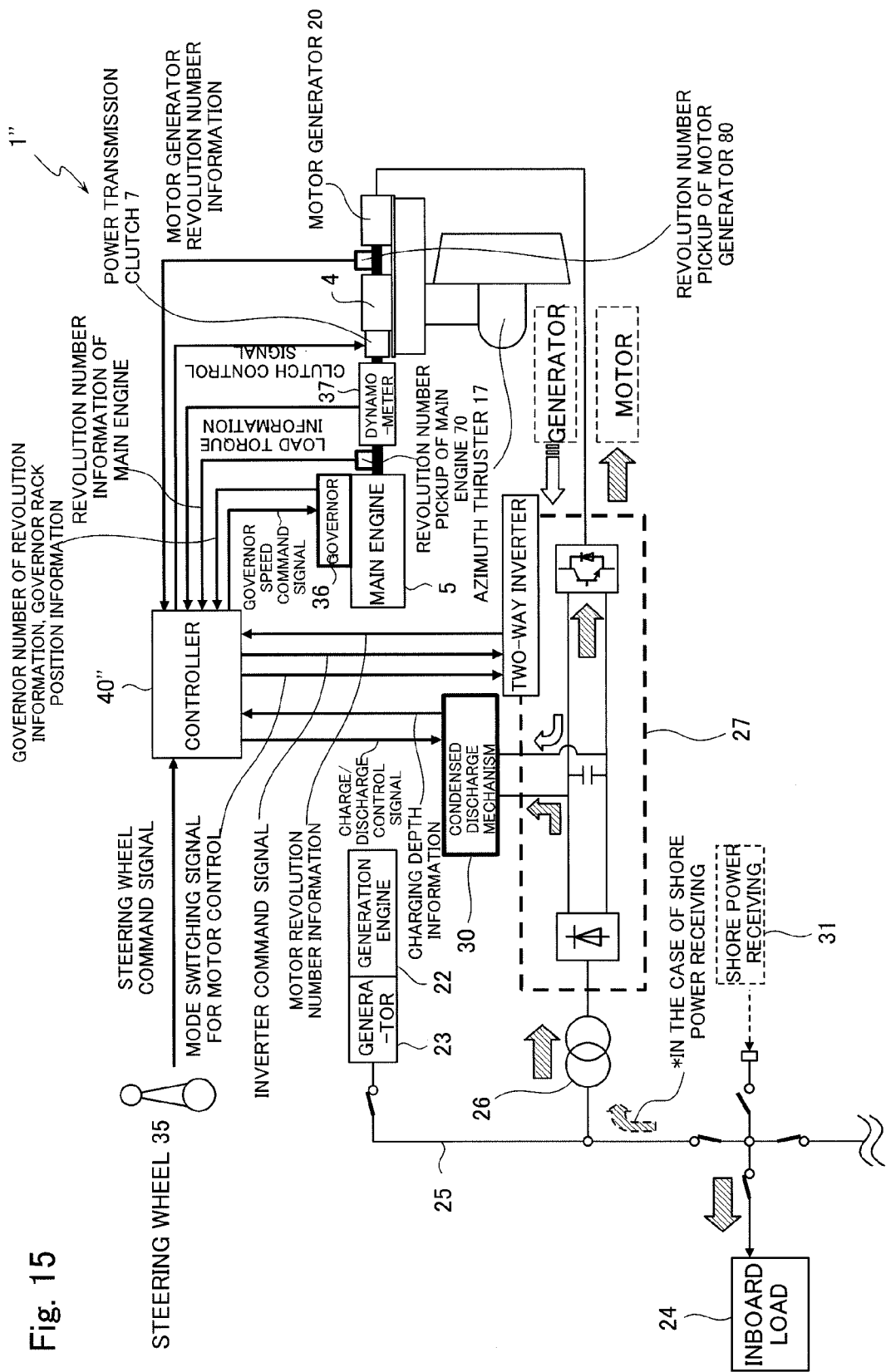
FIG. 15 is a control system diagram showing in particular the configuration of a control system in the general configuration of a marine propulsion device according to a fourth embodiment of the invention.

FIG. 15 is a control system diagram of a marine propulsion device 1" according to a fourth embodiment, in which as compared with the system of the third embodiment shown in FIG. 14, in order to acquire the revolution number information of the main engine 5 and the motor generator 20, revolution number pickups (a revolution number pickup 70 of the main engine and a revolution number pickup 80 of the motor generator) are installed on the rotating shafts, respectively, and the controller 40" is capable of acquiring the information of the number of revolutions of the main engine and the number of revolutions of the motor generator 20 from the respective revolution number pickups 70, 80. The substantially same components as those of the third embodiment are designated by the same reference signs as those of FIG. 14 in FIG. 15 to eliminate the description.

Although the revolution number information of the main engine 5 is acquired from the governor 36 and the revolution number information of the motor generator 20 is acquired from the two-way inverter 27 in FIG. 14, according to the present embodiment, the respective revolution number pickups 70, 80 of the main engine 5 and the motor generator 20 are installed to thereby make dual the revolution number information acquiring units, so that even when one of the sensors is broken, the control region can be switched without a problem.

REFERENCE SIGNS LIST

1 ... Marine propulsion device
2 ... Ship

3 ... Floor as base part
5 ... Main engine
6 ... Input shaft
7 ... Power transmission clutch
50 ... Main key
8 ... Input/output shaft
9 ... Upper bevel gear as first turning mechanism
11 ... Vertical shaft
12 ... Lower bevel gear as second turning mechanism
13 ... Propeller shaft
14 ... Propeller
17 ... Azimuth thruster
20 ... Motor generator
22 ... Generation engine
23 ... Generator
27 ... Two-way inverter
30 ... Condensed discharge mechanism
35 ... Steering wheel as control means
40, 40', 40" ... Controller as control means
50 ... Fire pump

The invention claimed is:

1. A marine propulsion device, comprising:
a power transmission clutch provided on an input shaft to transmit a driving force from a main engine;
a horizontal input/output shaft, one end side of which is connected to the input shaft through the power transmission clutch;
a vertical shaft, one end side of which is connected to a substantially central part of the input/output shaft through a first turning mechanism;
a horizontal propeller shaft, one end side of which is connected to another end side of the vertical shaft through a second turning mechanism;
a propeller fitted to another end side of the propeller shaft, in which the propeller is driven by the main engine to propel a ship, and the propeller shaft and the propeller are revolved around the vertical shaft to set a propulsion direction of the ship;
a motor generator connected to another end side of the input/output shaft;
an inverter converting an alternating current into a direct current and a direct current into an alternating current, connected to a power supply to control the motor generator; and
a controller, which propels the ship in a propulsion mode selected from a motor propulsion in which the power transmission clutch is disengaged from the input shaft to drive the motor generator as a motor, and a hybrid propulsion in which the power transmission clutch is connected to the input shaft to drive the motor generator as a motor or a generator with driving the main engine,
wherein the controller calculates based on a steering wheel command signal output by a ship operator to designate a revolution number of the propeller and a load applied on the main engine,
in response to a result of the calculation, the controller outputs a mode select signal for setting a control mode of the motor generator in a revolution number control mode or a torque control mode and an inverter command signal for driving the motor generator in a selected control mode to the inverter, and
the controller further outputs a clutch control signal for connecting or disengaging the power transmission clutch to the power transmission clutch, and a governor command signal for commanding the revolution number to the main engine,
thereby the controller controls the motor generator in the revolution number control mode in the motor propulsion in a motor propulsion region in which the revolution number of the propeller is equal to or less than a switching predetermined revolution number of the propeller, and the controller controls the main engine and the motor generator in the torque control mode in the hybrid propulsion in a hybrid region in which the revolution number of the propeller is equal to or more than the switching predetermined revolution number.

2. The marine propulsion device according to claim 1, further comprising a base part fitted to a bottom portion of the ship,
wherein the power transmission clutch, the input/output shaft and the first turning mechanism are mounted on a top face side of the base part and the vertical shaft is provided to penetrate the top face side of the base part, and the motor generator is mounted on an upside of the base part.

3. The marine propulsion device according to claim 2, further comprising a generation engine for supplying an electric power and a condensed discharge device for storing and supplying an electric power,
wherein the controller monitors a depth of charging of the condensed discharge device while receiving a charging depth information from the condensed discharge device, and stops charging of the condensed discharge device according to a charge/discharge control signal provided to the condensed discharge device when the charging depth of the condensed discharge device exceeds a predetermined value thereof, and
the controller controls the motor generator controlled in the torque control mode through the inverter so that a torque becomes zero to avoid overcharge of the condensed discharge device.

4. The marine propulsion device according to claim 3, wherein when the load is lower than a marine cube characteristic of the main engine, the inverter command signal, which is a minus torque command, is output to the inverter so that the motor generator is actuated as a generator to charge the condensed discharge device, and when the load is higher than the marine cube characteristic of the main engine, the inverter command signal, which is a plus torque command, is output to the inverter so that the motor generator is actuated as a motor to perform toque assist to the propulsion output of the main engine, and in the hybrid propulsion, the generator motor is switched as the generator or the motor.

5. The marine propulsion device according to claim 4, wherein the controller always acquires information of the revolution number of the main engine and the revolution number of the motor generator, and when switching from a motor propulsion region to a hybrid region, the controller outputs the clutch control signal to the power transmission clutch after confirming that the revolution numbers of the main engine and the motor generator coincide, to connect the power transmission clutch, and then the controller outputs a control mode signal for controlling the toque to the inverter to switch the control region from the motor propulsion region to the hybrid region.

* * * * *